Oct. 20, 1936.  W. GROSS  2,057,893

COMBINATION AIR SPRING AND SHOCK ABSORBER

Filed Nov. 2, 1934

INVENTOR.
Walter Gross
BY
Morrell Lieber & Morrell
ATTORNEYS.

Patented Oct. 20, 1936

2,057,893

UNITED STATES PATENT OFFICE 2,057,893

COMBINATION AIR SPRING AND SHOCK ABSORBER

Walter Gross, Milwaukee, Wis.

Application November 2, 1934, Serial No. 751,150

10 Claims. (Cl. 267—64)

This invention relates to improvements in combination air spring and shock absorber.

It is common practice, in vehicles or the like, to utilize not only mechanical springs, but, in addition, shock absorbers, the latter usually being of an hydraulic type. The present invention relates more particularly to a combination device which is adapted to serve both as a spring and shock absorber and, therefore, permit elimination of the usual leaf type spring. Heretofore, various devices for accomplishing a purpose similar to the present invention have been proposed, but said devices have been relatively complicated in nature, difficult to assemble, expensive, and of questionable efficiency.

It is a general object of the present invention to provide an improved air spring and shock absorber embodying a minimum of parts consistent with efficient operation, wherein no internal valves or other delicate mechanisms are necessary to control the flow of fluid.

A further object of the present invention is to provide a device of the class described which is so constructed as to permit ease of assembly during manufacture of the device.

A more specific object of the invention is to provide an improved air spring and shock absorber utilizing opposed, double-acting pistons wherein air or other compressible medium serves as a spring or performs a cushioning function, and wherein oil or other non-compressible medium carries out the snubbing effect to retard or dampen the natural oscillations of the air spring, the oil being movable in passageways arranged in a novel manner to effect efficient snubbing at necessary times only.

A further specific object of the invention is to provide a device of the class described wherein when the device is subjected to compression at slow speed the oil is permitted to flow with relative ease to produce a minimum snubbing effect, and wherein when the device is subjected to sudden compression at a high rate of speed the oil operates to produce a maximum snubbing effect.

While the invention is primarily intended for use in connection with automobiles, it is practical for use in any connection wherein it is desired to prevent transmission of vibrations, shocks, or the like from one mechanical part to another supported thereon.

With the above and other objects in view, the invention consists of the improved air spring and shock absorber and all its parts and combinations as set forth in the claims and all equivalents thereof.

In the accompanying drawing, illustrating one complete embodiment of the preferred form of the invention, in which the same reference numerals designate the same parts in all of the views.

Figure 1:
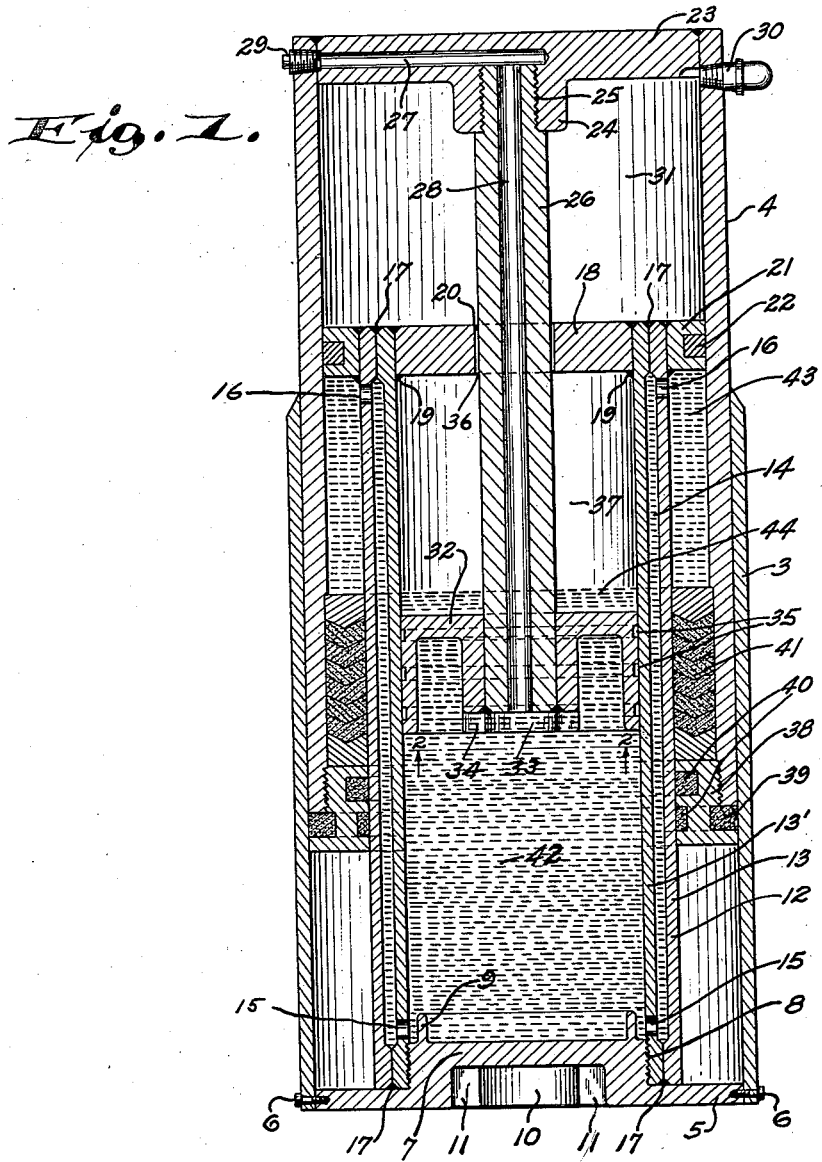
Fig. 1 is a longitudinal, vertical, sectional view thru the device.

Referring more particularly to the drawing, the numeral 3 designates a protecting cylinder having its upper end open for telescopically receiving a cylinder 4. The cylinder 3 has a plate 5 removably secured to its lower end by bolts or the like, as at 6, to form a closure therefor and provided with an upstanding interior projection 7 having a threaded periphery 8. The projection also has an upstanding annular ridge 9 which is spaced slightly inwardly from the periphery of the projection 7.

The exterior of the closure 5 is formed with a recess 10 having oppositely disposed slots 11, within which a turning tool may be inserted to facilitate assembly or removal of parts for repair purposes.

A second internal cylinder 12 is formed of spaced walls 13 and 13' which provide an annular chamber 14 of restricted width. One or more ports 15, which are preferably elongated in form, are provided near the lower end of the wall 13', and one or more similar ports 16 are formed near the upper end of the wall 13. The extreme lower end of the wall 13' is internally threaded to cooperate with the threading 8 on the extension 7, as shown in Fig. 1. The ports 15 are so located as to be in transverse alinement with the annular ridge 9.

The two wall parts 13 and 13', forming the cylinder 12, are preferably welded together, as at 17. A disc 18, suitably welded in position as at 19, closes the upper end of the cylinder 12; and said disc is formed with a central aperture 20 and forms a piston.

A ring 21 is welded around the external periphery of the wall 13 at its upper end, and said ring carries a piston ring or the like 22 to thereby form a sealed sliding contact with the inner surface of the cylinder 4.

The cylinder 4 has its upper end closed by a plate 23, and said plate is provided with a central depending part 24 having a threaded aperture 25, within which a tube 26 is screwed. A duct 27 affords communication with the passageway 28 of the tube, and said duct is closed by a plug 29, which may be removed when it is desired to replenish the supply of oil if said oil becomes exhausted for any reason. An air valve 30 of ordinary construction is adapted to permit insertion of air by means of an ordinary pump into the chamber 31 above the piston 18.

Figure 2:
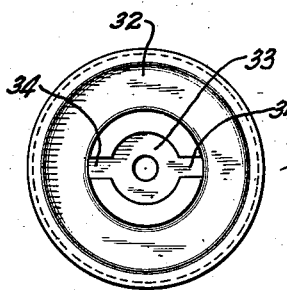
Fig. 2 is a view taken on line 2—2 of Fig. 1.

Welded or otherwise secured to the lower end of the tube 26 is a cup-shaped piston 32 which has its lower end formed with a circular recess 33 having communicating, opposed slots 34 (see Fig. 2). Said recess and slots permit insertion of a turning tool and facilitate assembly of the parts and threading of the rod 26 into the upper plate 23. The exterior periphery of the piston 32 is provided with a plurality of parallel oil grooves 35, and said piston is movable within the wall 13' with a relatively loose fit. There is also a definite amount of clearance 36 between the tube 26 and the opening 20 in the piston 18 to afford communication between the chamber 31 and a chamber 37 between the pistons 32 and 18.

Threaded in the lower end of the cylinder 4 is a ring 38, and said ring is constructed to receive an outer felt washer 39 forming a seal against the side of the cylinder 3, and inner washers 40 of similar material forming a seal against the exterior of the wall 13 of the cylinder 12. Above the ring 38 is supported a set of chevron packings 41, said packings being fixed in a recess in the inner wall of the cylinder 4 and being slidable on the wall 13 of the cylinder 12.

In assembly, the cylinder 12, with the piston 18 and ring 21 welded in position, is slid into the cylinder 4, the latter having its upper end closed by the plate 23. Next, the chevron packings 41 are inserted in place, and then the ring 38, to retain said packings in position. The tube 26, with the piston 32 attached thereto, is then slipped into the still open aperture 20 in the piston 18; and it is then threaded into place in the plate 23 with the use of a tool engaging the recess 33 and slots 34. Next, the extension 7 of the bottom 5 is threaded into the lower end of the cylinder 12 by the use of a tool engaging the recess 10 and slots 11; and then the protecting cylinder 3 is slid over the exterior of the cylinder 4 and secured to the bottom 5 by the bolts 6.

By removing the plug 29, a suitable amount of oil may be inserted into the chamber 42 below the piston 32, and said oil will flow thru the ports 15 into the annular chamber 14 between the walls 13 and 13' of the cylinder 12 and out of the port 16 into an annular chamber 43 formed between the ring 21 and the chevron packing. Next, a suitable amount of air to meet the requirements is pumped into the valve 30 to enter the chambers 31 and 37.

In use, the device may be supported in a suitable manner with one end attached to the frame of an automobile and the other end attached to the axle thereof. When a jolt occurs there will be a tendency for the cylinder 12 to telescope within the cylinder 4. This will cause compression of air within the chamber 31, and a portion of said compressed air will be permitted by the clearance 36 to pass into the chamber 37, and due to the necessity of the air to pass thru the very restricted opening, there will be an excellent cushioning effect obtained. Due to the clearance 36, the air pressure in the chambers 31 and 37 will quickly equalize, so that there will be cushioning in both directions. At the same time, the oil within the chamber 42 will be forced by the piston to travel outside of the annular ridge 9, thru the ports 15, into the restricted annular chamber 14, out of the port 16 at the upper end of said chamber, and into the relatively small chamber 43. If a sudden jolt is incurred, which tends to cause compression of the device at a relatively high degree, there will be a substantial snubbing effect, as the oil cannot be quickly transferred thru the restricted passageways from the chamber 42 to the chamber 43. On the other hand, if the compression force is a slow, gradual one, there will be very little snubbing effect, as the oil will not be rushed thru the narrow ports and passageways. As a result, a very desirable effect will be obtained, that of snubbing only when sudden shocks occur. On return action, the cylinders 4 and 12 will slide outwardly with respect to one another, or elongate, and the return action will be cushioned by the compression of air within the chamber 37, some of said air soon passing thru the clearance 36 into the chamber 21 to again automatically equalize the pressure in the two chambers 31 and 37. At the same time, on the return action, the oil in the small annular chamber will be compelled to pass back into the chamber 42, traveling thru the ports 16, annular chamber 14, and ports 15. A small amount of leakage is desirable between the piston 32 and the wall 13', so that a small amount of oil may be present, as at 44 above the piston 32.

From the above it may be seen that a very desirable arrangement has been provided, and it will be seen that the combination of the ports 15, annular chamber 14, and ports 16 affords a simple yet effective means for restricting the passage of oil from the chamber 42 to the chamber 43 and vice versa.

It will further be seen that the parts are so arranged with respect to one another and fit together as to simplify manufacture and facilitate assembly of the parts, thus making it possible to produce the device at relatively low cost.

Altho only one form of the invention has been shown and described, it is obvious that various changes and modifications may be made therein without departing from the spirit of the invention; and all of such changes are contemplated as may come within the scope of the claims.

What I claim is:

1. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end, said piston being apertured to slidably receive the stem of the first piston, and there being a chamber surrounding the stem between the first and second pistons, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, means affording restricted communication by a circuitous route between the lower portion of said inner chamber and the upper portion of said outer annular chamber, a non-compressible fluid in said two chambers, and a compressible fluid in the chamber between said first and second pistons and between the second piston and the closed end of the first cylinder.

2. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, means affording restricted communication by a circuitous route between the lower portion of said inner chamber and the upper portion of said outer annular chamber, a non-compressible fluid in said two chambers, and a compressible fluid between said first and second pistons and between the second piston and the closed end of the first cylinder.

3. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, means affording restricted communication by a circuitous route between said inner chamber and intermediate chamber and between said intermediate chamber and outer annular chamber, a non-compressible fluid in said intermediate chamber and outer chamber, and a compressible fluid between said first and second pistons and between said second piston and the closed end of the first cylinder.

4. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, means affording restricted communication by a circuitous route between the lower portion of said inner chamber and intermediate chamber and between the upper portion of said intermediate chamber and outer annular chamber, a non-compressible fluid in said intermediate chamber and outer chamber, and a compressible fluid between said first and second pistons and between said second piston and the closed end of the first cylinder.

5. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, the lower portion of the wall between said inner chamber and intermediate chamber having a port therein, and the upper portion of the wall between the intermediate chamber and the outer annular chamber having a port therein, a non-compressible fluid in said inner chamber, intermediate chamber, and outer annular chamber, and a compressible fluid between said first and second pistons and between said second piston and the closed end of the first cylinder.

6. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, the lower portion of the wall between said inner chamber and intermediate chamber having a port therein, baffle means in said inner chamber in line with said port, and the upper portion of the wall between the intermediate chamber and the outer annular chamber having a port therein, a non-compressible fluid in said inner chamber, intermediate chamber, and outer annular chamber, and a compressible fluid between said first and second pistons and between said second piston and the closed end of the first cylinder.

7. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, the lower portion of the wall between said inner chamber and intermediate chamber having a port therein, an annular ridge in said inner chamber in line with said port and spaced slightly therefrom, and the upper portion of the wall between the intermediate chamber and the outer annular chamber having a port therein, a non-compressible fluid in said inner chamber, intermediate chamber, and outer annular chamber, and a compressible fluid between said first and second pistons and between said second piston and the closed end of the first cylinder.

8. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end and having spaced double walls forming an intermediate chamber, said piston being apertured to slidably receive the stem of the first piston, and there being a chamber between the first and second pistons, said second cylinder being of substantially less diameter than the first cylinder to define an outer annular chamber between the walls of said first and second cylinders, spaced packing means between the walls of said first and second cylinders, means for closing the outer end of said second cylinder to define an inner chamber, the stem carrying the first piston having a duct therein communicating with the inner chamber, said first cylinder having an exteriorly accessible filling opening, a duct connecting said filling opening with the duct in the stem, means affording restricted communication by a circuitous route between said inner chamber and said annular chamber, a non-compressible fluid in said two chambers, and a compressible fluid in the chamber between said first and second pistons and between the second piston and the closed end of the first cylinder.

9. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end to define an upper chamber above said second piston and an intermediate chamber between said second piston and said first piston, said second piston being apertured to slidably receive the stem of said first piston, and said aperture being of such size as to provide clearance around the stem affording communication between said upper and intermediate chambers, means for closing the outer end of said second cylinder to define a lower chamber below the first piston, oil in said lower chamber, said first piston being formed with oil grooves to form a seal against admission of air to said lower chamber from said intermediate chamber, and air in said upper and intermediate chambers, said clearance around the stem of the first piston providing for automatic equalization of air pressure in the upper and intermediate chambers after each jolt or vibration.

10. A spring and shock absorbing device comprising a cylinder having a closed end and an open end, a stem projecting from said closed end within said cylinder, a piston carried by a portion of said stem spaced from the closed end, a second cylinder movable on said piston and having a piston carried by its inner end to define an upper chamber above said second piston and an intermediate chamber between said second piston and said first piston, said second piston being apertured to slidably receive the stem of said first piston, and said aperture being of such size as to provide clearance around the stem affording communication between said upper and intermediate chambers, means for closing the outer end of said second cylinder to define a lower chamber below the first piston, oil in said lower chamber, an auxiliary oil chamber, means leading from said auxiliary oil chamber and communicating with said lower chamber affording a circuitous path for the oil to travel, and air in the said upper and intermediate chambers, said clearance around the stem of the first piston providing for automatic equalization of air pressure in the upper and intermediate chambers after each jolt or vibration.

WALTER GROSS.